Nov. 3, 1953  J. L. SCRUGGS  2,657,674
HYDRAULIC POWER UNIT
Filed Sept. 22, 1949  3 Sheets-Sheet 1

INVENTOR
John L. Scruggs

ATTORNEYS

Nov. 3, 1953    J. L. SCRUGGS    2,657,674
HYDRAULIC POWER UNIT

Filed Sept. 22, 1949    3 Sheets-Sheet 2

INVENTOR
John L. Scruggs
BY
ATTORNEYS

Nov. 3, 1953 J. L. SCRUGGS 2,657,674
HYDRAULIC POWER UNIT
Filed Sept. 22, 1949 3 Sheets-Sheet 3

INVENTOR
John L. Scruggs
BY
ATTORNEYS

Patented Nov. 3, 1953

2,657,674

UNITED STATES PATENT OFFICE 2,657,674

HYDRAULIC POWER UNIT

John Luther Scruggs, North Sacramento, Calif.

Application September 22, 1949, Serial No. 117,093

1 Claim. (Cl. 121—121)

This invention is directed to, and it is an object to provide, novel apparatus for converting hydraulic pressure to rotary motion; the apparatus here being termed a hydraulic power unit.

A further object of the invention is to provide a hydraulic power unit which is especially adapted, but not limited, for use in a motor vehicle in substitution for the clutch and reduction or transmission gear assembly; the apparatus being operative to deliver a smooth, controlled flow of rotary power to the drive shaft of such a vehicle.

An additional object of the present invention is to provide a hydraulic power unit which embodies a radial type reciprocating motor and a novel distributor valve for feeding hydraulic pressure to, and simultaneously relieving it from, opposed cylinders of the motor in succession so as to produce rotary motion in said motor; said distributor valve being rotary and actuated from the crankshaft of the motor.

It is also an object of the invention to provide a hydraulic power unit which does not include any complex structure, thus permitting of ready and relatively economical manufacture of the unit.

A further object of the invention is to provide a practical and reliable hydraulic power unit, and one which will be exceedingly effective for the purpose for which it is designed.

These objects are accomplished by means of such structure and relative arrangement of parts as will fully appear by a perusal of the following specification and claim.

Figure 1:
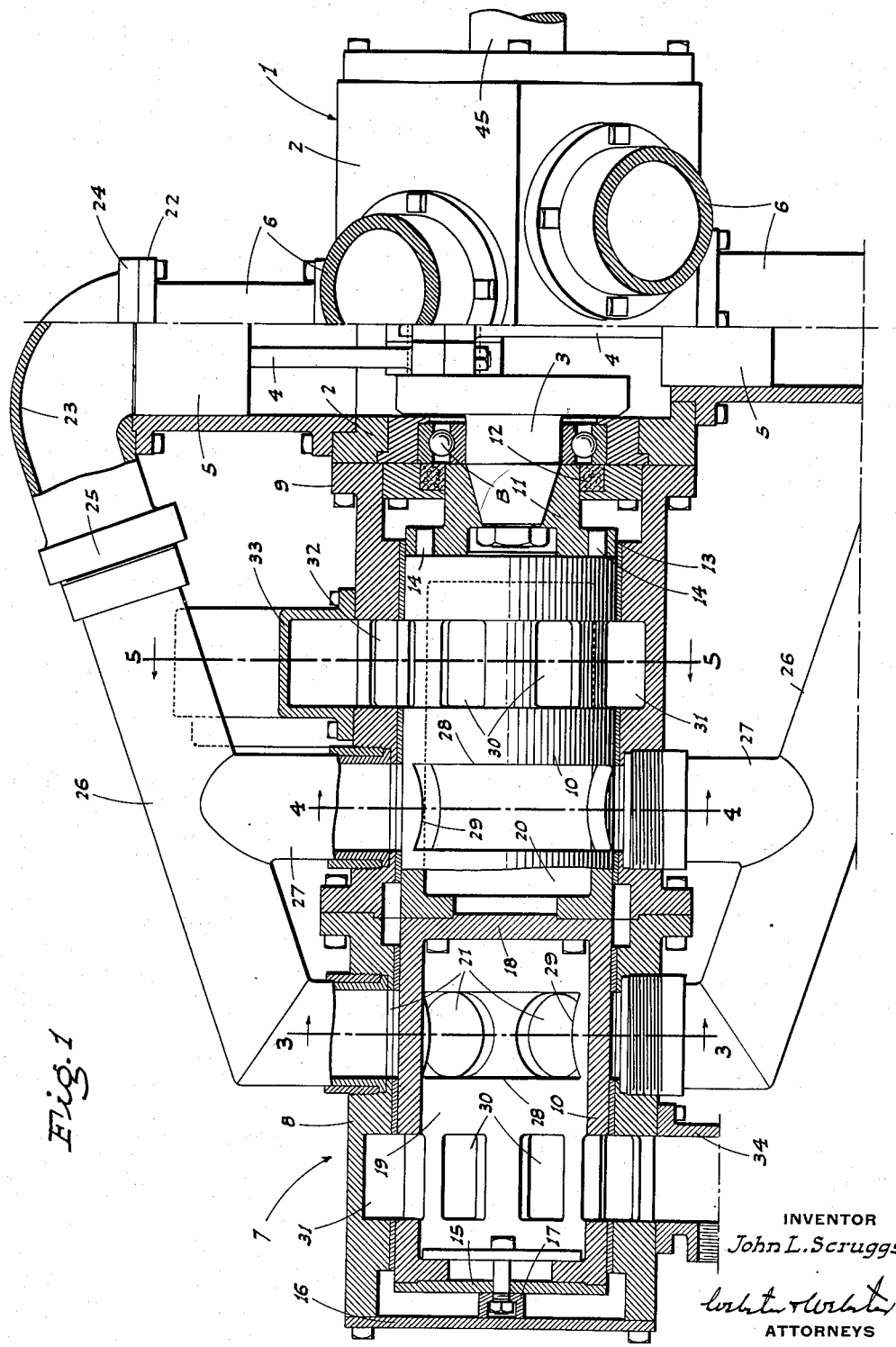
Fig. 1 is a longitudinal sectional elevation of the hydraulic power unit.
Figure 2:
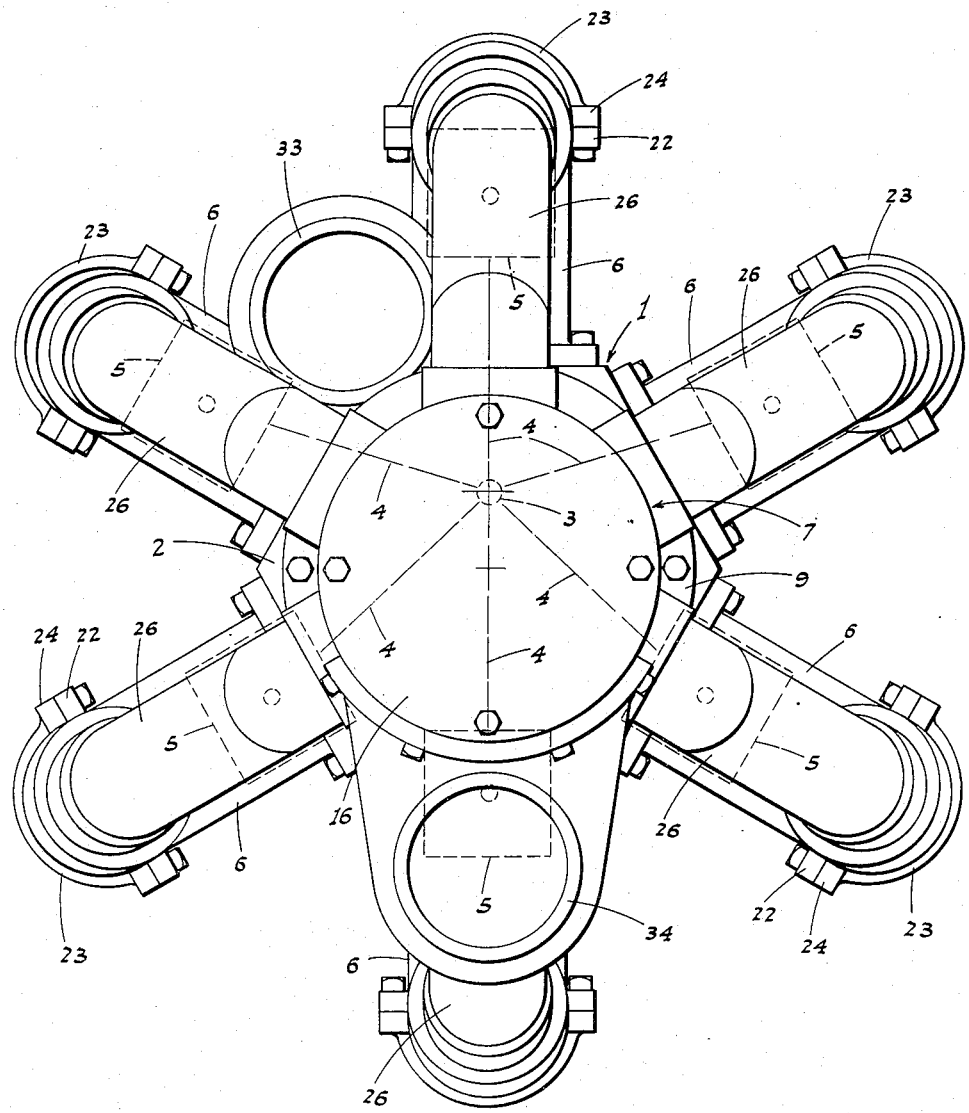
Fig. 2 is an end elevation taken from the distributor valve end of the unit.
Figure 3:
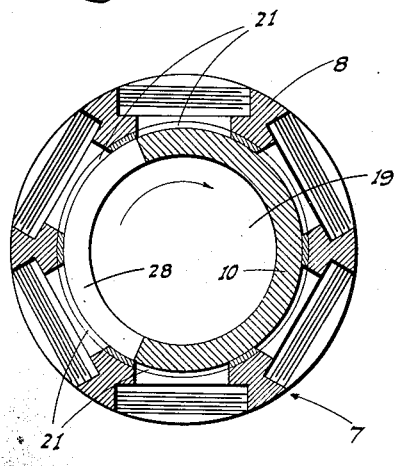
Fig. 3 is a cross section on line 3—3 of Fig. 1.
Figure 4:
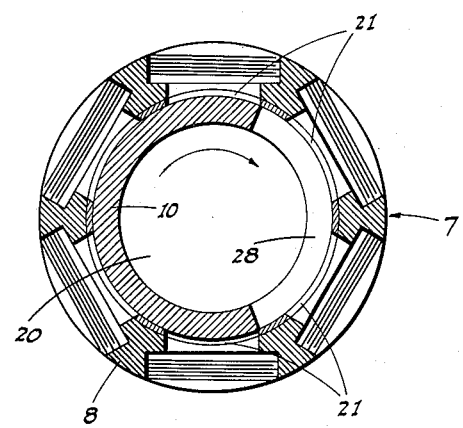
Fig. 4 is a cross section on line 4—4 of Fig. 1.
Figure 5:
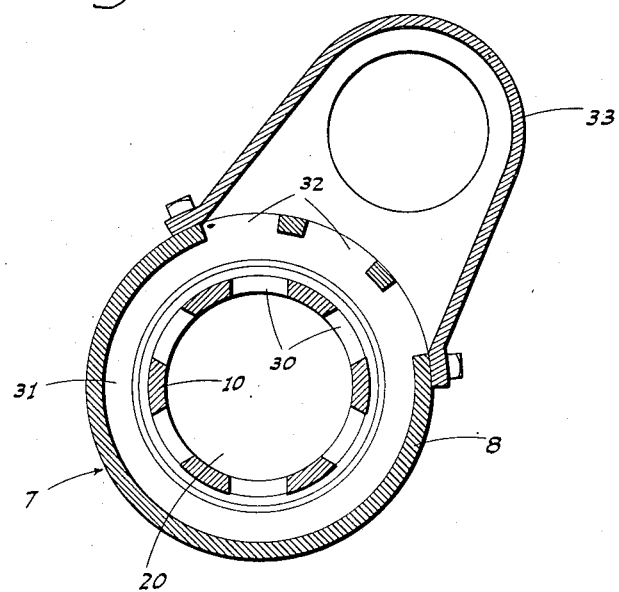
Fig. 5 is a cross section on line 5—5 of Fig. 1.

This application is a continuation in part of application, Serial No. 20,122 filed April 9, 1948, now abandoned.

Referring now more particularly to the characters of reference on the drawings, the novel hydraulic power unit comprises a radial type reciprocating motor, indicated generally at 1; such motor including a crankcase 2, a crankshaft 3, and connecting rods 4 radiating from the crankshaft and carrying pistons 5 which reciprocate in cylinders 6 mounted in circumferentially spaced relation on the crankcase 2.

A distributor valve, indicated generally at 7, projects centrally from one end of the motor 1 and comprises the following:

The numeral 8 indicates an elongated cylindrical body fabricated in two sections, as shown, for ease of manufacture and assembly; such cylindrical body 8 being flanged at its inner end, as at 9, and secured to the adjacent end of the crankcase 2 in coaxial relationship to the adjacent end of the crankshaft 3, which end of said crankshaft is journaled in a bearing B.

A rotary valve sleeve 10, likewise two-part or sectional for ease of manufacture and assembly, is disposed in the cylindrical body 8 with a close running fit. The inner end of the rotary valve sleeve 10 is connected, in driven relation, to the adjacent end of the crankshaft 3 as follows:

Said end of the crankshaft 3 is fitted with a hub 11 surrounded by a seal 12, and said hub is formed with an enlarged radial or driving flange 13. Pins 14 project from the adjacent closed end of the rotary valve sleeve 10 and are socketed in the driving flange 13.

At its outer end the rotary valve sleeve 10 terminates short of the corresponding end of the cylindrical body 8; said ends of the sleeve 10 and body 8 being fitted with end plates 15 and 16, respectively. A thrust block 17, carried centrally by the end plate 15, runs against the end plate 16 to assure against axial displacement of the rotary valve sleeve 10 in the cylindrical body 8.

Intermediate its ends the rotary valve sleeve 10 is formed with an internal partition 18 which forms separate internal chambers 19 and 20 in said rotary valve sleeve. The cylindrical body 8 is formed with a circumferential row of circular ports 21 therethrough in surrounding relation to each of the internal chambers 19 and 20 of the rotary valve sleeve 10; such ports corresponding in number to the cylinders 6.

Each cylinder is formed, at its outer end, with a head flange 22, to which a fitting 23 is secured by an attachment flange 24; there being a coupling 25 which secures each fitting 23 to a manifold type pipe 26 which extends longitudinally of the distributor valve 7; i. e. said manifold type pipes 26 are circumferentially spaced about the distributor valve 7 while extending lengthwise thereof.

Each manifold type pipe 26 includes a pair of laterally inwardly projecting branches 27 which connect with the corresponding ports 21 of the two circumferential rows of the latter.

The rotary valve sleeve 10 is formed with a part-circle, circumferential slot 28 therethrough in communication with each of the internal chambers 19 and 20, and said slots are disposed to run in register with the corresponding ports 21.

The slots 28 are of such part-circle, circumferential extent that each thereof—upon rotation of the sleeve 10—is continuously and progressively in register with a plurality of the related ports 21.

Additionally, the two part-circle slots 28 are circumferentially opposed so that with rotation of the sleeve 10, said slots register with ports 28 which correspond to opposed cylinders 6 of the motor 1.

The ends of the part-circle slots 28 are arcuate or concave, as at 29, in substantially matching relation to the circle of the ports 21, whereby as the slots begin to register with the individual ones of the ports, such registry is what may be termed fast opening; the slots 28 having a width substantially the diameter of the ports 21.

A circumferential row of slots 30 open through the rotary valve sleeve 10 from each of the chambers 19 and 20 alongside, but spaced from, the corresponding slot 28, and each row of said slots 30 runs at all times in communication with a full-circle, internal channel 31 formed in the cylindrical body 8.

The cylindrical body 8 is ported through from each of the channels 31, as at 32, and such porting communicates with an enlarged, generally L-shaped fitting secured externally on the cylindrical body 8, such fittings being shown at 33 and 34.

The fittings 33 and 34 comprise the means by which hydraulic pressure is fed into, and relieved from, the distributor valve 7; the latter being coupled to a suitable valve-controlled, hydraulic pressure conduit system.

When the above described hydraulic power unit is in operation, the output end 45 of the crankshaft 3 is connected to the mechanism which is to be driven. For example, when the hydraulic power unit is interposed in a motor vehicle in lieu of the clutch and transmission assembly, the output end 45 of the crankshaft 3 is connected to the drive shaft of the vehicle. In such an installation the pressure pump for the conduit system is connected to, and driven by, the motor vehicle engine, and it is possible with the described hydraulic power unit for said engine to run constantly without acceleration or deceleration with the vehicle.

With the valves 41 and 42 set as in Fig. 6, hydraulic pressure flows through the conduit 37 to the distributor valve 7 and returns to the tank through the conduit 36. With the valve so set the motor 1 is caused to rotate in one direction, say clockwise.

The function of the distributor valve 7 to cause operation of the motor 1 under the influence of such hydraulic pressure is as follows:

When the hydraulic power unit is in operation, and when hydraulic pressure feeds through fitting 34 into the internal chamber 19, the related slot 28 successively registers with the corresponding ports 21 to cause a hydraulic pressure feed to the corresponding cylinders 6 by means of the pipes 26. At the same time the slot 28 corresponding to the chamber 20 successively relieves the pressure from opposed ones of the cylinders 6; such relieved hydraulic pressure flowing through the fitting 33 and returning to the conduit system.

Thus, there is a constant or progressive succession of hydraulic pressure feed to the cylinders of the motor 1, with a corresponding relief of pressure from opposed cylinders, producing rotary motion of the crankshaft 3; the timing between the motor and distributor valve being such that the hydraulic pressure begins to feed to the cylinders when the pistons are at the top of their stroke, and begins to exhaust from the cylinders when the pistons are at the bottom of their stroke.

Such rotary motion is forceful and may be effectively regulated by the extent of hydraulic pressure fed to, and relieved from, the cylinders of said motor 1.

With the hydraulic power unit employed in a motor vehicle in lieu of the clutch and transmission assembly, a smooth, powerful drive is accomplished without the necessity of any reduction gear trains or the like; the unit being capable of developing a relatively great torque, and yet being easily controlled by the simple manipulation of the valves in the hydraulic pressure conduit system.

While especially designed for motor vehicle installation or the like, the hydraulic power unit is capable of many adaptations or uses. Further, by employing the crankshaft 33 as the driving medium rather than as a driven part, the unit would serve as a high-capacity pump.

The described hydraulic power unit eliminates the excessive friction loss now present in conventional clutch and transmission assemblies, thereby assuring of high efficiency, with little wear and tear on the working parts of the unit.

From the foregoing description it will be readily seen that there has been produced such a hydraulic power unit as substantially fulfills the objects of the invention as set forth herein.

While this specification sets forth in detail the present and preferred construction of the hydraulic power unit, still in practice such deviations therefrom may be resorted to as do not form a departure from the spirit of the invention, as defined by the appended claim.

Having thus described the invention, the following is claimed as new and useful, and upon which Letters Patent are desired:

In a fluid power unit, a fluid motor including a crankshaft and a radial cylinder, an elongated rotary valve connected to the shaft to turn therewith, said valve being hollow and divided into two longitudinally separated chambers, a fixed body surrounding and engaging the valve, the valve having a port leading to each chamber and the body having ports to register with the valve ports, a conduit leading from the outer end of the cylinder having spaced legs connected to the body ports, the body and valve chambers having other registering ports, an intake passage member connected to one of such other ports, and an exhaust passage member connected to the other one of said other ports; said first named valve ports being arranged in the valve so that when one of said ports is in register with the corresponding body port, the other valve port is out of register with the corresponding body port.

JOHN LUTHER SCRUGGS.

References Cited in the file of this patent

UNITED STATES PATENTS

| Number | Name | Date |
|---|---|---|
| 253,299 | Lapyre | Feb. 7, 1882 |
| 646,197 | Vaders | Mar. 27, 1900 |
| 674,237 | Gibson | May 14, 1901 |
| 1,229,076 | Hayes | June 5, 1917 |
| 1,924,423 | Svenson | Aug. 29, 1933 |
| 1,989,212 | Pascolini | Jan. 29, 1935 |
| 2,023,524 | Heaton | Dec. 10, 1935 |
| 2,086,535 | Centervall | July 13, 1937 |
| 2,372,523 | Sinclair | Mar. 27, 1945 |
| 2,435,611 | Sejarto | Feb. 11, 1948 |

FOREIGN PATENTS

| Number | Country | Date |
|---|---|---|
| 75,381 | Sweden | Sept. 27, 1932 |